United States Patent [19]
Sink et al.

[11] Patent Number: 5,949,869
[45] Date of Patent: Sep. 7, 1999

[54] CALLED PARTY CONTROL OF INCOMING CALLS

[75] Inventors: William Brian Sink, Overland Park, Kans.; Constance Ann DeWitt, Kansas City, Mo.; Karen Harden Miller, Overland Park, Kans.

[73] Assignee: Sprint Communications Co. L.P., Kansas City, Mo.

[21] Appl. No.: 08/789,887

[22] Filed: Jan. 28, 1997

[51] Int. Cl.⁶ .............................. H04M 7/00; H04M 1/64; H04M 3/42; H04Q 3/64

[52] U.S. Cl. ...................... 379/220; 379/88.25; 379/207; 379/221; 379/230; 379/265; 379/266; 379/309

[58] Field of Search ...................................... 379/112, 113, 379/114, 115, 127, 134, 210, 211, 219, 207, 220, 221, 230, 265, 266, 309, 88.25

[56] References Cited

U.S. PATENT DOCUMENTS 5,291,550  3/1994  Levy et al. ........................... 379/265 X
5,335,268  8/1994  Kelly, Jr. et al. .................... 379/265 X
5,452,350  9/1995  Reynolds et al. .................... 379/265 X

*Primary Examiner*—Harry S. Hong
*Attorney, Agent, or Firm*—Harley R. Ball; Bruce C. McClelland

[57] ABSTRACT

A call referral system (10) for use in a telecommunications network (12) that permits a called party (16) to control the number and treatment of incoming calls. The call referral system includes a switch (34) for receiving calls from calling parties (14) and for connecting the calls to the called party. The call referral system includes a routing monitor computer (40) coupled with the switch for monitoring the connection of the calls to the called party. The monitoring computer receives and stores a gate size selected by the called party indicating the maximum number of calls the called party wishes to simultaneously handle through each of its gates. The gates are comprised of single destination telephone numbers or groups of destination telephone numbers to the various destinations (17 & 18, 32).

20 Claims, 1 Drawing Sheet

CALLED PARTY CONTROL OF INCOMING CALLS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The present invention relates to telecommunications systems. More particularly, the invention relates to a call referral system and method that permits a called party to control the number of simultaneous incoming calls and the treatment and routing of excess calls.

2. Description of the Prior Art

Business telephone customers frequently receive more calls than their telephone equipment or operators can efficiently handle. The calls that exceed the capacity of the equipment or operators either receive a busy signal or are put on hold until the telephone equipment or an operator becomes available to handle the calls. The inability to efficiently handle all incoming calls may seriously affect a business because customers who cannot contact a business or who are put on hold too long may choose to call a competitor instead. These problems can become especially severe if the number of incoming calls unexpectedly peaks due to increased business activity or if the number of operators taking calls unexpectedly decreases due to absences or other unplanned events.

To deal with these problems, many businesses buy and operate call referral equipment such as automatic call distributors or routers that route excess calls within the telephone network at the business. However, these systems are expensive and difficult to operate. They require specially trained personnel to change the routing instructions if a business wishes to modify the handling and routing of excess calls. Additionally, these systems must be connected with the telecommunication provider's network if a business wishes to route excess calls to destinations served by other equipment. This further increases the costs of the systems. Another limitation of customer-operated call referral systems is that they can only queue calls once the calls have been connected to the systems. Unfortunately, this ties up the customer equipment until the calls are rerouted. Committing a call to a location, and then re-routing the call to another location is highly inefficient.

Call referral systems operated by telecommunications providers are also known in the art. For example, AT&T operates a call referral system that permits a telephone customer to control the number of incoming calls and to select the treatment of excess calls. Similarly, Sprint, the assignee of the present application, has operated a call referral system with similar features. Although these prior art network-operated call referral systems eliminate the need for businesses to purchase and operate their own call referral equipment, they also suffer from several limitations. For example, prior AT&T systems rerouted excess calls or queued calls based on a set of instructions that were provided by the called party when the called party subscribed to the service. These pre-set instructions are difficult to modify and thus prevent businesses from tailoring their routing instructions efficiently to accommodate changing business conditions, such as changes in the number of operators or fluctuations in the volume of incoming calls.

Accordingly, there is a need for an improved call referral system that permits business telephone customers to control the number of simultaneous incoming calls and the treatment and routing of excess calls without purchasing and operating expensive and complicated automatic call distributors and routers. There is also a need for such a system to have an automatic interface that permits a business to quickly and easily modify the instructions for handling incoming calls so that the business can tailor the handling of calls to accommodate changing business and operating conditions.

SUMMARY OF THE INVENTION

The present invention solves the above-described problems and is an advance in the art of call referral systems. More particularly, the present invention provides a network-operated call referral system that permits business telephone customers to specify the maximum number of calls that they will handle simultaneously, the distribution of those calls, and alternate call-handling instructions for handling excess calls. The invention allows these features without the need for the business to purchase and operate expensive and complicated automatic call distributors and routers. The present invention also permits business telephone customers to quickly and easily modify these instructions to accommodate changing business and operating conditions.

The call referral system of the present invention is preferably implemented on an interactive voice platform of a telecommunications network supporting toll-free processing and broadly includes a switch and processor. The switch is coupled with the network for receiving calls from the network destined for a called party. The processor is coupled with the switch for monitoring the status and distribution of existing calls connected to the called party and for controlling the switch matrix.

To operate the call referral system, the called party first assigns various of its destinations telephone numbers to gates. A gate may include only a single destination telephone number or it may include many destination telephone numbers. The called party then selects a gate size for each of the gates that it wishes to be monitored. The gate size indicates the maximum number of calls that the called party wishes to receive simultaneously over the destination telephone number(s) in the particular gate.

The called party also selects a set of prioritized alternate call-handling instructions to be implemented when the number of calls simultaneously connected to a gate's destination telephone number(s) exceeds the gate size. The alternate call-handling instructions may include connecting excess calls to an alternate destination telephone number or gate if one is available. Excess calls may also be connected to a voice message system, a voice capture system, a database computer, or a facsimile service.

Advantageously, the call referral system also includes a network-operated queue feature that permits excess calls to be queued in the network until the number of calls connected through one of the selected gates drops below its respective gate size. The calls are queued by the network before they reach the called party so that the called party's communication equipment is not tied up. Calls may also be referred to the most eligible called party from the network. This avoids re-routing the calls from business equipment, and subsequently, increasing the required capacity of the business equipment. The alternate call-handling instructions include queue instructions.

The called party can control the time for which calls are held in queue by selecting a queue time threshold. When the queue time for the oldest call in queue exceeds this threshold, the system stops queuing new calls. The called party can also specify the maximum number of calls simultaneously held in queue and the treatment of calls held in queue. The treatment options may include holding calls in silence or treating them to music, messages, or a combination of music and messages.

The called party can define the gate sizes and alternate call-handling instructions to create a set of instructions that vary the routing and queue instructions based on the time of day, day of the week, or other factors. The system can also prioritize calls as they enter the queue based on ANI recognition or DTMF entries made by the calling party. By virtue of gating calls at the toll-free destination telephone number level rather than at the trunk level, the called party can prioritize the number of calls answered by a toll-free number or by an application, i.e. sales vs. customer service in an environment where multiple toll free numbers are answered over a single trunk.

Once the called party has selected its gate sizes and alternate call-handling instructions, the instructions are stored in the processor. When the telecommunications network receives a call destined for the called party, the processor determines the appropriate destination telephone number to the called party and its respective gate using the routing instructions. The processor then determines if the appropriate gate size is exceeded. If the gate size is not exceeded, the processor instructs the switch to connect the call to the called party using the selected destination telephone number. However, if the gate is fully occupied, the processor instructs the switch to implement one of the appropriate alternate call-handling instructions that may not necessarily connect the call to the called party.

The system of the present invention also permits the called party to conveniently change gate sizes or alternate call-handling instructions to tailor the handling of incoming calls to accommodate changing business and operating conditions. These changes can be made with a computer coupled with the processor using a terminal interface or by a telephone coupled with the processor using a touch-tone or voice interface.

The call referral system of the present invention provides numerous advantages. For example, by permitting business customers to control the distribution and maximum number of simultaneous incoming calls nearly in real time, businesses can match the number of incoming calls to the available number of customer service operators so that callers will have the opportunity to speak directly with an operator. The system also permits businesses to control the treatment of excess calls to best handle callers that cannot immediately speak with an operator. Additionally, by permitting business telephone customers to quickly and easily modify the gate assignments, gate sizes, and alternate call-handling instructions for their destination telephone numbers, businesses can tailor their phone services to accommodate changing business and operating conditions such as fluctuations in the number of operators at various sites or number of incoming calls.

BRIEF DESCRIPTION OF THE DRAWING FIGURE

The drawing FIGURE is a block diagram of a call referral system constructed in accordance with a preferred embodiment of the invention and shown coupled with a conventional telecommunications network.

DETAILED DESCRIPTION OF THE PREFERRED EMBODIMENTS

Figure 1:
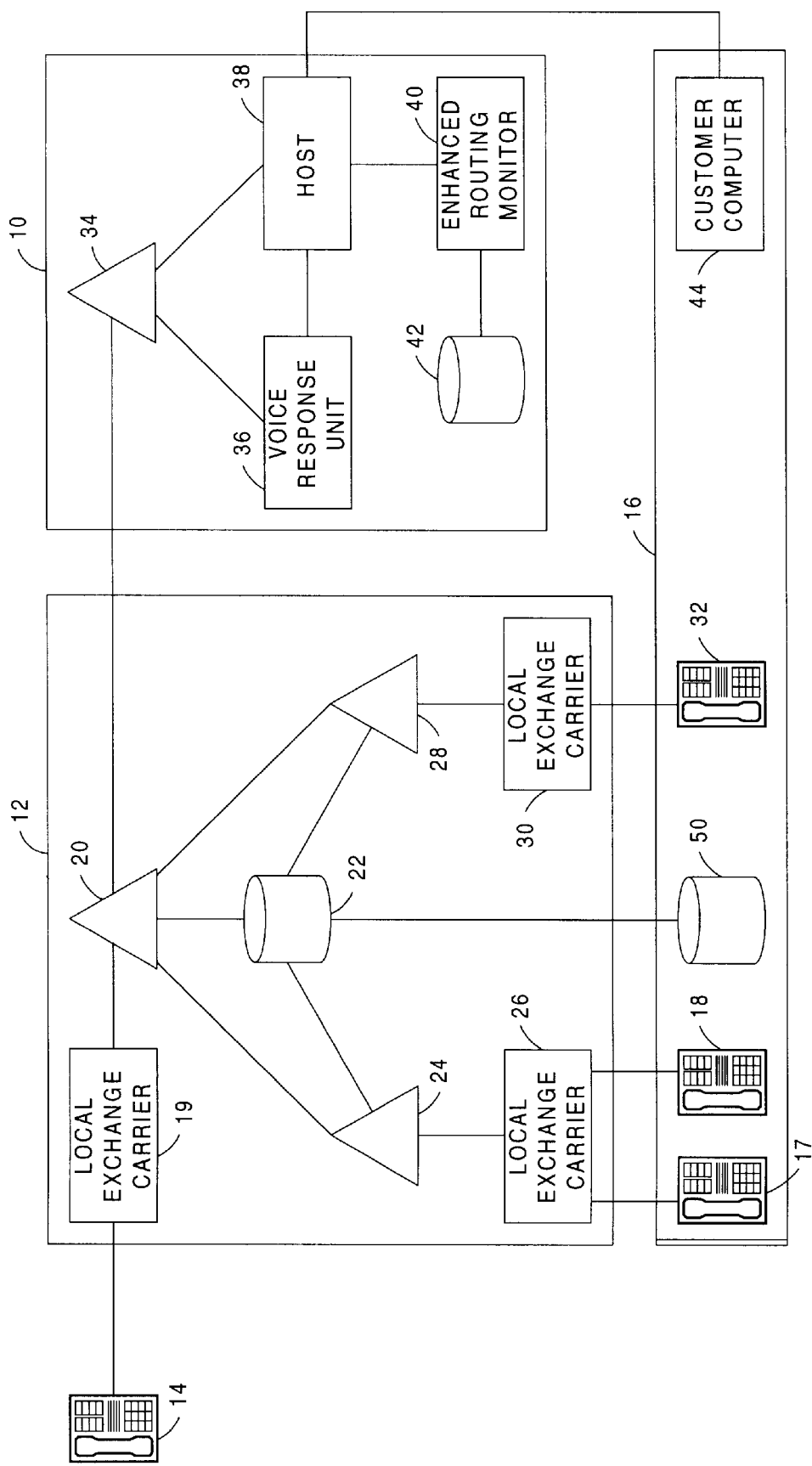

The present invention controls the number of simultaneous calls that are directed to a destination telephone number or a set of destination telephone numbers. Typically, these destination telephone numbers are toll-free numbers that connect to a business. Some examples of toll-free numbers are "800" numbers or "888" numbers. In some embodiments, the caller will dial a first toll-free number that is used by the telephone network to connect the call to a call-referral system that operates in accord with the present invention. The call-referral system will then select a second toll-free number for use by the telephone network to extend the call to the called party. This second number is referred to as the destination telephone number. Those skilled in the art will appreciate that the invention also applies to other types of destination telephone numbers—for example, POTS, "900", or virtual private network numbers.

Call referral system 10 of the present invention is coupled with telecommunications network 12 as illustrated in the drawing figure. System 10 is operable for referring calls, such as toll-free calls, from calling party 14 to called party 16. Call referral system 10 is preferably coupled with a toll-free call integrated voice platform of network 12; however, those skilled in the art will appreciate that system 10 may also be coupled with a toll call platform. Called party 16 is typically a business telephone customer that operates telephone equipment at customer call destinations 17, 18 and 32. Called party 16 receives calls placed to a plurality of toll-free telephone numbers that are handled by network 12. Calling party 14 may be a customer of called party 16.

Telecommunications network 12 is conventional and may include local exchange carrier (LEC) 19, originating interexchange carrier (IXC) switch 20, service control point (SCP) 22, terminating IXC switch 24, LEC 26, alternate terminating IXC switch 28, and LEC 30. Generally, calling party 14 initiates communication with called party 16 by dialing one of the called party's toll-free numbers. The call is routed through the calling party's LEC 19 and transferred to originating IXC switch 20. Originating IXC switch 20 queries SCP 22 for a translation of the dialed toll-free number, and as a result of the translation, routes the call to call referral system 10.

System 10 can refer the call to called party 16 using a destination telephone number that it selects based on routing instructions. System 10 monitors the calls to called party 16 and the controls the distribution of calls to called party 16's destination telephone numbers. The destination telephone numbers are typically toll free numbers. As is known, toll-free numbers can be used to connect to individual or multiple destinations. In the preferred embodiment, destinations 17 and 18 are both represented by a common destination telephone number while destination 32 is represented by another destination telephone number. For example, destination 17 may be located in San Francisco, destination 18 in Los Angeles and destination 32 in New York. Once system 10 provides IXC switch 20 with the proper destination telephone number, IXC switch 20 may route the call to IXC switch 24 for transfer to destinations 17 or 18 via LEC 26, or IXC switch 20 may route the call to IXC switch 28 for transfer to alternate destination 32 via LEC 30. Originating IXC switch 20 will query SCP 22 to translate the destination telephone number when routing the call to called party 16.

Call referral system 10 preferably includes switch matrix 34, voice response unit (VRU) 36, host computer 38, enhanced routing monitor (ERM) 40, and ERM database 42. Switch matrix 34 is a conventional SUMMA-type switch. VRU 36 is a conventional voice response unit such as those manufactured by Dialogic or Texas Micro. Host computer 38 is preferably a conventional computer such as those manufactured by Tandem. ERM 40 and ERM database 42 are preferably integrated in host computer 38. Alternately, ERM 40 and ERM database 42 may be incorporated in a stand alone computer coupled with host computer 38. Host computer 38 and ERM 40 are programmed in a conventional manner to perform the monitoring and routing functions described herein. Preferably, system 10 is a redundant system.

As discussed above, the number first dialed by calling party 14 is typically a toll-free number that is translated to a routing number by SCP 22. The routing number is used by network is 12 to route the call to system 10. Likewise, the destination telephone number selected by system 10 is also typically a toll-free number that is translated to a routing number by network 12 in order to route the call to called party 16. A "gate" is a destination telephone number or a group of destination telephone numbers that will connect to called party 16. In some embodiments, the gates are comprised of toll-free numbers. One skilled in the art will also appreciate that ordinary POTS numbers "900" numbers, or virtual private network numbers could also be used to form gates. These numbers could also be used to access system 10.

To operate call referral system 10, called party 16 first selects which of its destination telephone numbers will comprise the gates that system 10 will monitor. A gate may be a single destination telephone number or multiple destination telephone numbers. Called party 16 then selects gate size for each gate. Each gate size indicates the maximum number of calls that called party 16 wishes to simultaneously handle through the destination telephone number(s) in that gate. For instance, if called party 16 wishes to receive a maximum of 10 simultaneous calls over the San Francisco/Los Angeles gate, it selects a gate size of 10 for that gate. A maximum of 10 simultaneous calls will be allowed to the destination telephone number(s) of this gate.

Called party 16 also selects a set of prioritized alternate call-handling instructions for each of its monitored gates. As described in detail below, these alternate call-handling instructions are implemented if the number of calls through a selected gate exceeds its respective gate size. The alternate call-handling instructions may include connecting excess calls to: an alternate destination telephone number; a voice message system; a voice capture system (that permits the caller to leave a message such as the caller's name, address and phone number); a database speakback system for providing voice information to calling party 14; or a facsimile service.

Advantageously, call referral system 10 also includes a network-operated queue feature that permits excess calls to be queued within system 10 or network 12 until the maximum number of calls connected to the selected gate or an alternate gate drops below its respective gate size. The calls are queued by system 10 or network 12 before they reach called party 16 so that the called party's communication apparatus at destinations 17, 18 and 32 are not congested with waiting calls. Called party 16 can limit the time that calls are held in queue by selecting a queue time threshold. When the queue time for the oldest call held in queue exceeds this threshold, the system stops queuing new calls.

Called party 16 can also specify the maximum number of calls simultaneously held in queue and the treatment of calls held in queue. The treatment options may include whether the calls are treated to silence, music, messages, or some combination of music and messages. The queuing feature may also connect calling party 14 to another program that has access to a database computer operated by called party 16 so that the queue can be made interactive. Such a program, for example, may permit calling party 14 to perform balance inquiries, validate account information such as credit cards, receive information from called party 16 via facsimile, listen to promotional information, or play trivia games. The alternate call-handling instructions can include queue instructions.

Called party 16 can also prioritize the alternate call-handling instructions. For instance, called party 16 can direct system 10 to first attempt to connect calls to the destination telephone number representing the gate to destinations 17 and 18. If the gate size is met, excess calls would be connected to an alternate gate such as the destination telephone number of destination 32. If the alternate gate exceeds its gate size, the calling party 14 could be connected to a message system. Called party 16 can also vary the routing and queue instructions based on the time of day, day of the week or many other factors. System 10 can also prioritize the sequence of the calls held in queue based on ANI recognition or DTMF entries made by the calling party. Once called party 16 has specified the gate size and alternate call-handling instructions for each of its gates, the instructions are stored in ERM 40 or ERM database 42. Host computer 38 and ERM 40 then monitor the connection of calls to called party 16 as described below.

The following embodiment typifies a specific example of the invention, although one skilled in the art will appreciate other variations which do not depart from the scope of the invention. When calling party 14 dials one of the called party's toll-free numbers, party 14 is connected to system 10 by IXC 20 as described above. Switch 34 allocates a port of VRU 36 to the call. Switch 34 then notifies host computer 38 that a new call has been received, and passes the DNIS and ANI of the call to host computer 38. Host computer 38 instructs VRU 36 to play specific voice message. VRU 36 plays a voice message for the caller. For example, VRU 36 may play a message that instructs the caller to DTMF the number "1" if the caller wishes to be connected with a customer service agent and DTMF the number "2" if the caller wishes to be connected to other customer personnel. The caller responds to the message by entering a selection by DTMF. VRU 36 sends the selection to host computer 38, which then determines whether the caller has selected to be connected to one of the called party's destination telephone numbers in a monitored gate.

If the selected number is in a monitored gate, host computer 38 sends a request to ERM 40 to determine if the gate is currently receiving its maximum number of calls. ERM 40 will query the gate counter to determine the number of existing calls connected to the destination telephone number(s) assigned to the gate and compares this number to the gate size. ERM 40 then informs host computer 38 whether the gate size has been exceeded.

If the gate size has not been exceeded, host computer 38 instructs switch 34 to outdial the selected destination telephone number in order to connect the call to called party 16 at one of its call reception locations, such as destination 17. However, if the gate size has been exceeded, host computer 38 instructs switch 34 to implement one of the alternate call-handling instructions discussed above. For example, host computer 38 may instruct switch 34 to connect the call to an alternate destination telephone number to destination 32. When a call that has been previously connected to called party 16 over one of the monitored gates is terminated, switch 34 sends a release message to host computer 38. Host computer 38 then instructs ERM 40 to decrement the count of calls for that gate.

Host computer 38 and ERM 40 are also programmed to generate call referral statistics that enable called party 16 to manage and control system 10. For example, host computer 38 and ERM 40 may keep track of the number of calls made to a particular destination telephone number, the number of calls that exceeded the selected gate sizes in a certain amount of time, and the percentage of calls that exceeded the selected gate sizes.

Advantageously, call referral system 10 permits called party 16 to quickly and easily change the gate assignments, gate sizes, and alternate call-handling instructions stored in ERM 40 and ERM database 42. Called party 16 can control the handling of calls through an automatic interface in order to accommodate changing business and operating conditions. Call referral system 10 is configured so that these changes can be made in several convenient ways. For example, the changes can be made via computer 44 coupled with system 10 by a dial-up line or a dedicated line. Additionally, changes can be made via a telephone operated by called party 16 and coupled with system 10 by a touch-tone or voice interface. To prevent unauthorized tampering with system 10, host computer 38 or ERM 40 may first require called party 16 to enter an access code before the changes are made.

For example, if a called party has Western U.S. offices in San Francisco and Los Angeles and an Eastern U.S. office in New York, it may designate that the gate to the Eastern office can receive 20 simultaneous calls. If a snowstorm hits New York, the office may not be able to handle more than a few calls. Since the effects of such snowstorms are not always known beforehand, the called party is typically left without a convenient and user-friendly way to quickly re-route calls away from New York based on the actual number of calls being received. The invention solves this problem by allowing the called party to place a telephone call to an automated interface at system 10 in order to re-route the calls. The system would typically prompt the called party for an access code which could be input with DTMF tones. (Alternatively, voice recognition could be used to accept caller voice instructions instead of DTMF inputs.) The system would then prompt the called party through a menu that would allow them to re-route incoming calls by altering the gate sizes. In this example, the called party may want to lower the maximum number of simultaneous calls through the gate to the New York office to 3, and to raise the maximum number of simultaneous calls through the gate for the San Francisco and Los Angeles offices to 30. This could be accomplished automatically through voice prompts that prompt for gate sizes to these gates. The called party could then alter those gate sizes with DTMF inputs. Later in the day when the New York office closes, the called party may want to lower the maximum number of calls to the New York office to zero, and to raise the maximum number of calls to the Western U.S. offices to 35. When the snowstorm subsides, the called party may return the system to its original status with a telephone call and some additional DTMF inputs.

In addition, the called party 16 may be provided with equipment to dial up access to host computer 38 and make changes. A dedicated access line could also be used to access host computer 38. This would allow the called party to access a screen display listing gates sizes and assignments of destination telephone numbers to gates. These gate sizes and assignments could be altered while on-line.

It can be seen that the system allows a called party to easily control the number of simultaneous calls received at various locations around the country. Advantageously, the called party can readily associate an actual number of simultaneous calls with a particular destination's ability to handle that number of calls. The called party is then able to alter these maximum numbers nearly in real time through an automated interface. The interface might be through a telephone call and DTMF or voice inputs, or through a computer log-in over a modem or a dedicated access line.

Also shown in FIG. 1 is database 50. Database 50 is an intelligent call router. For example, the call router provided by Geotel. The intelligent call router monitors conditions at destinations 17 and 18 of called party 16. When a call is extended from system 10 using a toll free destination telephone number, SCP 22 will translate that destination telephone number in order to route the call to called party 16. SCP 22 can interface with database 50 (the intelligent call router) to obtain routing instructions based on conditions at destinations 17 and 18 of called party 16. In this way, system 10 can control the distribution of calls within a single gate. For each destination telephone number within a gate, database 50 can control the distribution of calls to the various destinations for that particular destination telephone number. Conventional toll-free routing features that are known in the art can also be used to affect the routing to the destination telephone number.

The present invention allows the called party to control the number of simultaneous calls to each toll-free number or group of toll-free numbers in a gate. Additionally, the called party can further control the allocation of calls at the trunk level. Although the invention has been described with reference to the preferred embodiment illustrated in the attached drawing figures, it is noted that equivalents may be employed and substitutions made herein without departing from the scope of the invention as recited in the claims. Having thus described the preferred embodiment of the invention, what is claimed as new and desired to be protected by Letters Patent includes the following:

We claim:

1. A method of operating a call referral system for use with a telecommunications network wherein the telecommunications network routes a call placed to a called party to the call referral system and wherein the telecommunication network extends the call to the called party using a destination telephone number provided by the call referral system, the method comprising:

receiving and storing in the call referral system a maximum number of calls that may simultaneously use the destination telephone number;

receiving and storing alternate call-handling instructions in the call referral system;

receiving the call from the telecommunications network into the call referral system;

determining the destination telephone number for the call;

determining if the maximum number of calls for the destination telephone number would be exceeded by the call;

if the maximum number of calls for the destination telephone number would not be exceeded by the call, providing the destination telephone number to the telecommunications network in order to extend the call to the called party;

if the maximum number of calls for the destination telephone number would be exceeded by the call, executing the alternate call-handling instructions; and automatically altering the maximum number of calls for the destination telephone number in response to a request from the called party wherein the request is received through an automated interface into the call referral system.

2. A method of operating a call referral system for use with a telecommunications network wherein the telecommunications network routes calls placed to a called party to the call referral system and wherein the telecommunication network extends the calls to the called party using destination telephone numbers provided by the call referral system, the method comprising:

receiving and storing gate assignments for a plurality of gates in the call referral system wherein one of the gate assignments indicates a particular set of destination telephone numbers that are assigned to one of the gates;

receiving and storing a gate size for each gate in the call referral system wherein the gate size indicates the maximum number of calls that may simultaneously use the destination telephone numbers assigned to that gate;

receiving and storing alternate call-handling instructions in the call referral system;

receiving the calls from the telecommunications network into the call referral system;

determining a particular destination telephone number and a particular gate size for each call;

determining if the particular gate size for each call would be exceeded by that call;

if the particular gate size would not be exceeded by that call, providing the destination telephone number to the telecommunications network in order to extend that call to the called party;

if the particular gate size would be exceeded by that call, executing the alternate call-handling instructions; and automatically altering the gate sizes, the gate assignments, or the alternate call handling instructions in response to a request from the called party wherein the request is received through an automated interface into the call referral system.

3. The method of claim 2 wherein the particular set of destination telephone numbers is comprised of a single telephone number.

4. The method of claim 2 wherein the particular set of destination telephone numbers is comprised of toll-free numbers.

5. The method of claim 2 wherein the alternate call-handling instructions include connecting the calls to a voice message system.

6. The method of claim 2 wherein the alternate call-handling instructions include connecting the calls to a voice capture system.

7. The method of claim 2 wherein the alternate call-handling instructions include providing access to a called party database.

8. The method of claim 2 wherein the alternate call-handling instructions include connecting the calls to a facsimile system.

9. The method of claim 2 wherein the alternate call-handling instructions include connecting the calls to an alternate destination telephone number.

10. The method of claim 2 wherein the alternate call-handling instructions include queue instructions.

11. The method of claim 2 wherein the alternate call-handling instructions include queue instructions that include a time threshold.

12. The method of claim 2 wherein the alternate call-handling instructions include queue instructions that include a queue size.

13. The method of claim 2 wherein the alternate call-handling instructions include queue instructions that include connecting the call to a voice message system.

14. The method of claim 2 wherein the alternate call-handling instructions include queue instructions that include connecting the call to a voice capture system.

15. The method of claim 2 wherein the alternate call-handling instructions include queue instructions that include providing access to a called party database.

16. The method of claim 2 wherein the alternate call-handling instructions include queue instructions that include connecting the call to a facsimile system.

17. The method of claim 2 further including generating call referral statistics reflecting usage of the call-referral system.

18. The method of claim 2 wherein the automated interface uses automated voice instructions that prompt DTMF inputs from a caller.

19. The method of claim 2 wherein the automated interface is provided by a called party computer that connects to the call-referral system.

20. The method of claim 2 further comprising automatically altering one of the alternate call-handling instructions in response to a request from the called party that is received through the automated interface.

* * * * *